| (12) | United States Patent | (10) Patent No.: | US 9,035,483 B2 |
|---|---|---|---|
| | Simon | (45) Date of Patent: | May 19, 2015 |

(54) FIELDBUS UNIT FOR A TWO-CONDUCTOR FIELDBUS

(75) Inventor: Antoine Simon, St. Louis (FR)

(73) Assignee: ENDRESS + HAUSER FLOWTEC AG, Reinach (CH)

( * ) Notice: Subject to any disclaimer, the term of this patent is extended or adjusted under 35 U.S.C. 154(b) by 1452 days.

(21) Appl. No.: 12/452,954

(22) PCT Filed: Jul. 10, 2008

(86) PCT No.: PCT/EP2008/058965
§ 371 (c)(1),
(2), (4) Date: Jan. 29, 2010

(87) PCT Pub. No.: WO2009/016014
PCT Pub. Date: Feb. 5, 2009

(65) Prior Publication Data
US 2010/0145541 A1    Jun. 10, 2010

(30) Foreign Application Priority Data

Aug. 2, 2007   (DE) .......................... 10 2007 036 580

(51) Int. Cl.
*H02J 1/00*        (2006.01)
*G01D 21/00*    (2006.01)
*H04L 12/40*    (2006.01)

(52) U.S. Cl.
CPC .......... *G01D 21/00* (2013.01); *H04L 12/40045* (2013.01); *H04L 2012/40221* (2013.01)

(58) Field of Classification Search
CPC .................................. H04L 12/10; H02J 3/14
USPC .............................................. 307/1; 700/295
See application file for complete search history.

(56) References Cited

U.S. PATENT DOCUMENTS 2,979,626 A  *  4/1961  Pinckaers ...................... 307/111
3,246,210 A  *  4/1966  Lorenz .......................... 361/211

(Continued)

FOREIGN PATENT DOCUMENTS

DE        600 10 935 T2     8/2005
EP        1 158 274          11/2001

(Continued)

OTHER PUBLICATIONS

Tietzu, U., Schenk, C., Halbleiter-Schaltungstechnik, Springer-Verlag, Berlin, Heidelberg, 1991.

*Primary Examiner* — Jared Fureman
*Assistant Examiner* — Alfonso Perez Borroto
(74) *Attorney, Agent, or Firm* — Bacon & Thomas, PLLC

(57) ABSTRACT

A fieldbus unit for connection of a field device to a fieldbus comprising two conductors is designed to transfer a signal via the fieldbus by modulation of an electrical current drawn by the field device. The fieldbus unit comprises: an electrical current control transistor, through which the electrical current drawn by the field device flows, wherein the electrical current drawn by the field device is controlled via a base current of the electrical current control transistor; a bipolar transistor, via whose emitter-collector, electrical current path the base current for driving the electrical current control transistor flows; as well as an electrical current controller, which produces an electrical current control signal for controlling the electrical current drawn by the field device. The base of the bipolar transistor is placed at an essentially constant potential, which is so selected, that the bipolar transistor supplies the electrical current control transistor a base current sufficient for start-up of the field device, when the electrical current controller is not supplied with electrical current and delivers no electrical current control signal. The electrical current controller feeds the electrical current control signal via the emitter-collector, electrical current path of the bipolar transistor.

17 Claims, 2 Drawing Sheets

(56) References Cited

U.S. PATENT DOCUMENTS

| | | | |
|---|---|---|---|
| 3,439,181 A * | 4/1969 | Kelly et al. | 307/38 |
| 3,600,599 A * | 8/1971 | Wright et al. | 307/53 |
| 3,943,380 A * | 3/1976 | Morgan et al. | 327/89 |
| 4,061,962 A * | 12/1977 | Stewart | 323/273 |
| 4,634,894 A * | 1/1987 | Shu et al. | 327/537 |
| 5,132,660 A * | 7/1992 | Chen et al. | 340/428 |
| 5,170,151 A * | 12/1992 | Hochstein | 340/636.15 |
| 5,185,789 A * | 2/1993 | Hanon et al. | 379/395 |
| 5,239,579 A * | 8/1993 | Schuh | 379/395 |
| 5,577,129 A * | 11/1996 | Ehara | 381/113 |
| 5,579,397 A * | 11/1996 | Ikeda et al. | 381/113 |
| 5,648,754 A * | 7/1997 | Hwang | 340/426.28 |
| 5,719,522 A * | 2/1998 | Saitou et al. | 327/540 |
| 6,091,611 A * | 7/2000 | Lanni | 363/79 |
| 6,222,445 B1 * | 4/2001 | Beckhusen | 340/457 |
| 6,266,424 B1 * | 7/2001 | Papadopoulos et al. | 381/113 |
| 7,027,804 B2 * | 4/2006 | Mufti et al. | 455/417 |
| 7,683,596 B1 * | 3/2010 | Kaplish | 323/283 |
| 2003/0132668 A1 * | 7/2003 | Lanni | 307/38 |
| 2006/0080049 A1 * | 4/2006 | Budmiger et al. | 702/45 |
| 2007/0247006 A1 * | 10/2007 | Ball | 307/139 |
| 2011/0196547 A1 * | 8/2011 | Park et al. | 700/296 |
| 2012/0092811 A1 * | 4/2012 | Chapel et al. | 361/622 |

FOREIGN PATENT DOCUMENTS

| | | | |
|---|---|---|---|
| JP | 2005-12680 | | 1/2005 |
| JP | 2005012680 A | * | 1/2005 |
| WO | WO 03/021195 | | 3/2003 |

\* cited by examiner

FIELDBUS UNIT FOR A TWO-CONDUCTOR FIELDBUS

TECHNICAL FIELD

The invention relates to a fieldbus unit as well as to a field device.

BACKGROUND DISCUSSION

In process automation technology, field devices are often applied, which serve for registering and/or influencing process variables. Examples of such field devices include fill level measuring devices, mass flow measuring devices, pressure, and temperature, measuring devices, etc., which, as sensors, register the corresponding process variables, fill level, flow, pressure, and temperature.

Serving for influencing process variables are actuators, e.g. valves or pumps, via which the flow of a liquid in a pipeline section, or the fill level in a container, can be changed.

Referred to as field devices are, in principle, all devices, which are applied near to the process and deliver, or work with, process relevant information.

A large number of such field devices are available from the firm, Endress+Hauser.

As a rule, field devices in modern industrial plants are connected via bus systems (Profibus, Foundation Fieldbus, etc.) with superordinated units (control systems or control units). These superordinated units serve for, among other things, process control, process visualizing, process monitoring, as well as for configuring the field devices.

In endangered areas, especially two-conductor fieldbusses, such as, for example, Profibus PA or Fieldbus Foundation busses, are applied, in the case of which both the electrical current supply of the field device as well as also data transmission from the field device (slave) to the superordinated unit (master) occur over two conductors. When the particular field device desires to transmit measurement data to the master, a corresponding electrical current modulation is impressed on the electrical current flow through the field device. Through analysis of this electrical current modulation, the master can obtain data from the field device.

In the solutions of the state of the art, the electrical current modulation occurs by means of an electrical current control transistor. For producing the electrical current modulation, the base current of the electrical current control transistor is varied corresponding to an electrical current control signal. However, the fieldbus units of the state of the art have the disadvantage that, during start-up, there is yet no base current available for the electrical current control transistor, since the fieldbus unit is not yet supplied with electrical current. Therefore, the electrical current control transistor is initially blocked. In order, nevertheless, to be able to start the field device, some solutions of the state of the art provide bypass circuits, which shunt the electrical current control transistor initially, during start-up, and supply the circuit components of the fieldbus unit, during start-up, with electrical current.

From EP 1 158 274 A1, controlled electrical current sources of two-conductor measuring devices are known, which provide the higher energy requirement required during the turning-on of a direct voltage source.

Such bypass circuits are complex and expensive. For example, appropriate circuitry must be provided, in order to remove the bypass circuit after the start-up, or at least to avoid, that the electrical current taken by the bypass circuit disturbs the electrical current modulation on the fieldbus. A further disadvantage is that the bypass circuit must be able to process the relatively high bus voltage, e.g. up to 35V according to the IEC61158-2 standard, section 12.7.2, which likewise means additional circuit complexity.

SUMMARY OF THE INVENTION

An object of the invention is to provide a fieldbus unit for connection to a two-conductor fieldbus, which enables, with little circuit complexity, a reliable start-up of the field device.

This object is achieved by comprising two conductors, wherein the fieldbus unit is designed for transferring a signal over the fieldbus by modulation of an electrical current drawn by the field device, the fieldbus unit, comprises: an electrical current control transistor, through which the electrical current drawn by the field device flows, wherein the electrical current drawn by the field device is controlled via a base current of said electrical current control transistor; an electrical current controller, which produces an electrical current control signal for controlling the electrical current drawn by the field device; and a bipolar transistor, via whose emitter-collector, electrical current path the base current for operating said electrical current control transistor flows, wherein: the base of the bipolar transistor is kept at an essentially constant potential, which so is selected, that said bipolar transistor supplies said electrical current control transistor a base current sufficient for start-up of the field device, when said electrical current controller is not supplied with electrical current and delivers no electrical current control signal; and said electrical current controller feeds the electrical current control signal via the emitter-collector, electrical current path of said bipolar transistor.

In the solutions of the state of the art, the base current of the electrical current control transistor is controlled by a drive transistor operated in common emitter configuration. An electrical current control signal is connected with the base of the drive transistor, and the base current for the electrical current control transistor is led over the emitter-collector electrical current path of the drive transistor.

In contrast therewith, in the case of the solution of the invention, the base (or the gate) of the drive transistor is held at an essentially constant potential. The drive transistor is thus operated in common base configuration. The electrical current control signal is coupled in via the emitter-collector electrical current path (or the source-drain electrical current path) of the drive transistor.

This drive circuit has the advantage, that also when yet no electrical current control signal is present, already a base current for the electrical current control transistor is delivered. This can be achieved by a corresponding choice of the potential of the base (or the gate). In this way, the electrical current control transistor is immediately switched to conduct upon being turning on and can supply the different circuit components of the fieldbus unit with electrical current, without requiring that a bypass circuit be provided for this. The previously required bypass circuit can, consequently, be omitted, which means a significant simplification of the drive circuit. Moreover, the implementing of the drive circuit on an integrated circuit is simplified.

The application of a drive transistor operated in common base configuration has, moreover, the advantage, that the electrical current amplification in the drive circuit is clearly smaller than in the case of the solutions of the state of the art, this enabling a more exact control of the electrical current drawn by the field device. As a result thereof, the dynamic impedance of the fieldbus unit is improved.

BRIEF DESCRIPTION OF THE DRAWINGS

The invention will now be explained in greater detail on the basis of plural examples of embodiments, as illustrated in the drawing.

The figures of the drawing show as follows.

DETAILED DISCUSSION IN CONJUNCTION WITH THE DRAWINGS

Figure 1:
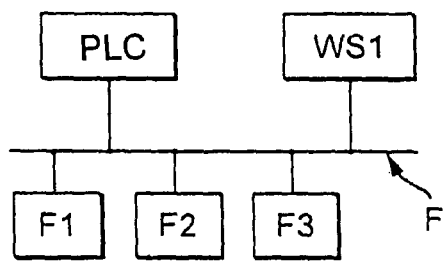
FIG. 1 shows schematically, a Profibus network.

FIG. 1 shows a Profibus network with three field devices F1, F2, F3, a control unit PLC and an additional superordinated unit WS1, which exchange data via a fieldbus F.

In the case of the Profibus network illustrated in FIG. 1, such could involve, for example, an overfilling preventer for a liquid storage tank. Field device Fl measures the fill level in a container. Field device F2 is a valve and controls the outflow of the liquid from the container. Field device F3 is a limit level switch, which registers maximal fill level in the container. A control program in the control unit PLC, which can be e.g. a programmable logic controller, controls the fill level in the container. The control unit PLC is a Profibus master, while the field devices F1, F2, F3 are Profibus slaves.

Fieldbusses comprising two conductors are applied especially for linking field devices in endangered areas, for example, in explosion endangered areas. The individual field devices do not have their own electrical current supplies, but, instead, are supplied with electrical current via the two conductors of the fieldbus. Moreover, also data exchange between a control unit (master) and the field device (slave) is conducted in both directions via the two conductors of the fieldbus. In such case, the voltage on the fieldbus is controllable by the control unit, thus the master. The data to be transferred from the master to the field device, for example, measurement data, which were registered by a physical to electrical, sensor element, are modulated onto the voltage signal by the master, and, indeed, preferably in the form of a so-called Manchester code. The field device operated in the slave-mode is, in contrast, not authorized to modify the voltage set by the master on the fieldbus. For data transmission in the direction from the field device to the master, the field device impresses an electrical current modulation on the electrical current drawn by the fieldbus, and, indeed, preferably likewise in the Manchester code. This electrical current modulation can then be detected by the master. In this way, data exchange from the field device to the master is possible, without the field device altering the voltage on the fieldbus.

Figure 2:
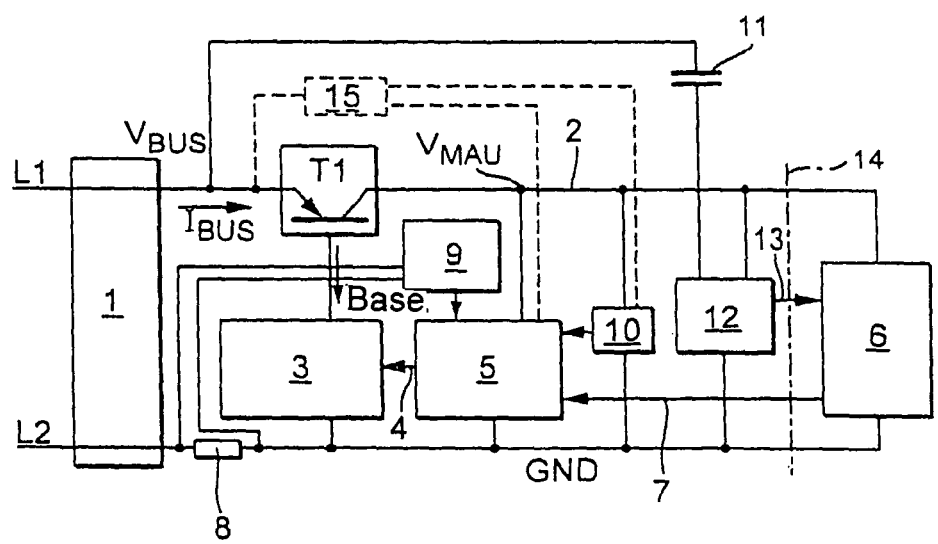
FIG. 2 is a block diagram of a fieldbus unit for two-conductor field devices.

FIG. 2 shows a fieldbus unit of the invention for a two-conductor fieldbus. The two conductors L1, L2 of the fieldbus are drawn on the left side of FIG. 2. These two conductors are connected to the fieldbus unit via a disturbance removing, rectifier unit 1. The disturbance removing, rectifier unit 1 comprises a rectifier as well as a disturbance removing filter for suppressing electromagnetic disturbances. The disturbance removing, rectifier unit 1 can also contain an overcurrent protection element, such as a fuse or an FDE (Fault Disconnect Equipment). Moreover, the disturbance removing, rectifier unit 1 enables a decoupling of the fieldbus unit from the fieldbus. Through the fieldbus is made available to the fieldbus unit a bus voltage $V_{Bus}$ as well as a circuit zero point GND. The bus voltage $V_{Bus}$ lies on the emitter of an electrical current control transistor T1. The electrical current control transistor T1 is the crucial part of the fieldbus unit illustrated in FIG. 2. The electrical current control transistor T1 controls the bus current $I_{Bus}$ flowing through the field device. The electrical current control transistor T1 is, especially, responsible for superimposing an electrical current modulation on the electrical current brought from the fieldbus, in order, in that way, to transfer information from the field device to the master. The bus current $I_{Bus}$ flowing over the emitter-collector path of T1 is controlled by the base current $I_{Base}$ of T1. By varying the base current $I_{Base}$, the electrical current draw of the field device can be controlled and a desired electrical current modulation impressed.

When the emitter-collector path of the electrical current control transistor T1 is conducting, the supply voltage $V_{MAU}$ is available on the collector of T1 for supplying the function blocks connected to the supply line 2 with electrical current. In such case, "MAU" stands for "Medium Attachment Unit" according to the standard, IEC61158-2.

Averaged over time, an electrical current of, for example, 11 mA flows through the field device. During the electrical current modulation, electrical currents of 11 mA +/−9 mA are impressed on the fieldbus. Thus, alternately, electrical currents of 2 mA or 20 mA flow through the fieldbus unit. For controlling the electrical current, a drive circuit 3 is provided, which, in accordance with an electrical current control signal 4, controls the base current $I_{Base}$ of the transistor T1 and therewith also the bus current $I_{Bus}$. The electrical current control signal 4 is produced by an electrical current controller 5. The information to be modulated on is made available to the electrical current controller 5 from a digital signal processing unit 6 as digital signal 7. The electrical current is then modulated by the electrical current controller 5 corresponding to this digital signal 7.

The instantaneous value of the electrical current, which flows through the fieldbus unit, is ascertained with the assistance of a low-ohm electrical current measuring resistor 8. The voltage falling across the electrical current measuring resistor 8 is evaluated by an electrical current determining unit 9, and the so ascertained actual current is supplied to the electrical current controller 5. Moreover, a reference voltage unit 10 is provided, which makes available to the electrical current controller 5 one or a number of reference voltages.

As already described above, information transfer occurs in the reverse direction, thus from the master to the field device, by modulating the information onto the bus voltage $V_{Bus}$. For receiving this modulated data, the modulated signal portion goes via the capacitor 11 to the receiving filter 12. For additional evaluation, the signal 13 obtained on the output of the receiving filter 12 is fed to the digital signal processing unit 6. Preferably, the digital signal processing unit 6 is galvanically isolated by a galvanic barrier 14 from the rest of the fieldbus unit. The galvanic barrier can be implemented, for example, with the assistance of optocouplers or DC/DC-converters.

In the case of the fieldbus units of the state of the art, the problem exists, that, during start-up of the field device there is yet no base current $I_{Base}$ and the electrical current control transistor T1 is therefore blocked. Therefore, the bus voltage $V_{Bus}$ is not present on supply line 2. As a result thereof, the electrical current controller 5, the reference voltage unit 10, the receiving filter 12 and the digital signal processing unit 6 are not supplied with electrical current. As a result, also no electrical current control signal 4 is produced for the drive circuit 3. In order to be able, in spite of this, to start the fieldbus unit, some solutions of the state of the art provide a bypass 15, which shunts the blocking transistor T1 during start-up and supplies the electrical current controller 5 as well as the reference voltage unit 10 with the bus voltage $V_{Bus}$. In this way, the electrical current controller 5 is enabled to deliver an electrical current control signal 4, a base current $I_{Base}$ begins to flow, and the transistor T1 is caused to conduct.

This solution with the assistance of a bypass 15, which is activated during start-up, has, however, some important disadvantages. In the case of the solution of the invention, consequently, the bypass 15 is omitted. In order to be able to start the fieldbus unit without such a bypass, in the case of the solution of the invention, the drive circuit 3 is modified in such a manner, that, during start-up, thus in the case of no electrical current control signal 4, it already conducts and, thus, a base current $I_{Base}$ flows. This is in contrast to the previously used drive circuits, which, during start-up, are in the blocked state, wherein a base current first begins to flow, when an electrical current control signal 4 becomes available. The drive circuit 3 of the invention is so designed, that, in the absence of an electrical current control signal 4, a base current already flows, wherein the electrical current control signal 4 serves to lessen the initially flowing base current $I_{Base}$. In the case of the solutions of the state of the art, an initially not flowing base current first begins to flow with increasing electrical current control signal 4.

Figure 3A:
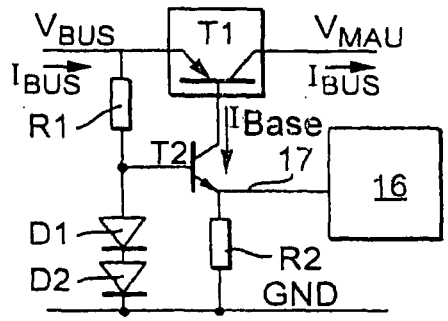
FIG. 3A is a first form of embodiment of the drive circuit of the invention.
Figure 3B:
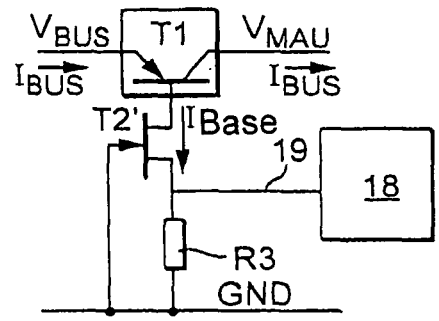
FIG. 3B is a second form of embodiment of the drive circuit of the invention.

Shown in FIGS. 3A and 3B are two possible forms of embodiment of a drive circuit of the invention. In the case of the variant illustrated in FIG. 3A, a bipolar transistor T2 is used as drive transistor for the electrical current control transistor T1. In other than in the case of the solutions of the state of the art, the base of the drive transistor T2 is placed at a constant potential. In the case of the solution illustrated in FIG. 3A, the base of T2 is connected with the circuit zero point GND via two diodes D1, D2, each of which is turned in the conduction direction. Moreover, the base of T2 is connected with the bus voltage $V_{Bus}$ via a resistor R1 of, for example, 1 Mohm. Since there is a voltage drop of about 0.5 V on each of the two diodes D1, D2, the base of T2 is at a constant potential of about +1 V relative to the circuit zero point GND.

The base of the electrical current control transistor T1 is connected via the emitter-collector path of T2 and the electrical current limiting resistor R2 with the circuit zero point GND. Since the base of T2 is at a positive potential of about +1 V, a control current flows via base and emitter of T2, and, as a result of this control current, a base current $I_{Base}$ flows via the collector-emitter path of T2 and the electrical current limiting resistor R2. The base current $I_{Base}$ flows also when the electrical current controller 16 is inactive and makes no electrical current control signal available. This is, for example, the case during the turning on, because the electrical current controller 16 during the turning on is not yet supplied with electrical current. In the case of the drive circuit of the invention, already during the turning on, a base current $I_{Base}$ is present, which makes the transistor T1 conductive, so that the various components of the fieldbus unit receive the required supply voltage $V_{MAU}$. In the case of application of the drive circuit illustrated in FIG. 3A, the previously applied bypass 15 can be omitted without replacement.

In the case of the circuit illustrated in FIG. 3A, a base current $I_{Base}$ flows from the beginning. The reason therefor is that the base of T2 is held at constant potential, so that the transistor T2 is thus operated in common base configuration, instead of, as in the case of previous solutions, in common emitter configuration. While the electrical current control signal 17, in the case of the solutions of the state of the art, is connected with the base of T2, the electrical current control signal 17 is now coupled into the emitter-collector, electrical current path of T2, in order to modulate the base current $I_{base}$. Since the base current $I_{Base}$ already flows when the electrical current controller 15 receives no supply voltage, the fieldbus unit can start-up without complications. As soon as the fieldbus unit is started up, the electrical current controller 16 can, with the assistance of the electrical current control signal 17, check and modulate the base current $I_{Base}$ and therewith also the electrical current $I_{Bus}$ flowing through the entire fieldbus unit. Especially, by feeding an electrical current control signal 17 to the junction between the emitter of T2 and the resistor R2, the voltage drop on R2 can be increased and, as a result thereof, the base current $I_{Base}$ can be lessened.

Through application of this changed drive circuit, the previously applied bypass 15 can be omitted without replacement, so that the circuit is essentially simplified. A further advantage is that the drive circuit can be integrated on an IC. In the case of the previous solutions of the state of the art, which require a bypass, it is necessary, to supply to the drive circuit the bus voltage $V_{Bus}$. Since the bus voltage is comparatively high (e.g. up to 35 V), the IC must be produced in a special chip technology, which can carry such a voltage. These complications go away in the case of the solution of the invention, which can very well be accommodated on an IC.

In the case of application of a bypass, it is, moreover, required, to turn off the bypass after the start-up of the field device. Alternatively thereto, the bypass can also remain active, in which case, however, the electrical current drawn by the bypass must be held constant, in order not to degrade the electrical current modulation on the fieldbus. All this leads to circuit engineering complications. These complications can be avoided through use of the fieldbus unit of the invention.

A further advantage of the drive circuit of the inventions is that a drive transistor operated in common base configuration T2 causes no additional electrical current amplification, since the electrical current control signal is fed directly into the emitter-collector, electrical current path. In the case of the drive circuits of the state of the art, the drive transistor T2 is operated in common emitter configuration, which is characterized by an electrical current amplification factor β2 of about 20 to 400. This means that an electrical current control signal applied to the base of T2 brings about an around the factor 20 to 400 higher emitter-collector, electrical current, which then, as base current, drives the base of the electrical current control transistor T1. Since also T1 has an electrical current amplification β1 of about to 400, there results the total amplification of the system at β1×β2. Because of this actually too high electrical current amplification, smallest fluctuations of the electrical current control signal lead to strong fluctuations of the bus current $I_{Bus}$. Moreover, the noise level of the control signal applied to the base of T2 is likewise amplified, so that, as a whole, an instable and inexact control of the bus current $I_{Bus}$ results.

These problems are, in the case of the drive circuit of the invention, prevented by operating the drive transistor T2 in common base configuration. Since the electrical current control signal is fed into the emitter-collector, electrical current path of T2, the electrical current amplification β2 of the drive transistor T2 is equal to 1. The electrical current control signal delivered by the electrical current controller 16 lies, consequently, in the order of magnitude of the base current $I_{Base}$ for operating T1. In this way, a comparatively precise electrical current control is enabled. Especially, it is prevented, that fluctuations and the noise level of the electrical current control signal 17 are inappropriately strongly amplified.

As a result of the improved accuracy of the drive circuit of the invention, also the dynamic impedance of the electrical current control is improved. Dynamic impedance is defined as the quotient of a voltage variation ΔU modulated onto the fieldbus and the electrical current variation ΔI caused thereby. The faster the electrical current control readjusts the electrical current, the smaller is ΔI, and the larger is the dynamic impedance. The dynamic impedance measures, thus, the speed of the electrical current readjustment. In the case of Profibus PA and Fieldbus Foundation, the dynamic impedance in the frequency range between 7.8 kHz and 39 kHz must be greater than 3 kohm, according to section 12.5.2 of the standard, IEC61158-2. This requirement can be fulfilled with the drive circuit of the invention essentially more easily than with the circuits of the state of the art.

FIG. 3B shows an alternative form of embodiment of the invention, in the case of which a field effect transistor is applied as drive transistor T2'. The gate connection of the drive transistor T2' is set at a constant potential. Preferably applied as field effect transistor is a junction-FET, abbreviated JFET. In the case of a JFET, the source-drain path is already switched to conduction, when the gate is connected with the circuit zero point GND. The base of the electrical current control transistor T1 is connected with the circuit zero point GND via the source-drain path of T2' and the electrical current limiting resistor R3. In the case of the circuit arrangement illustrated in FIG. 3B, a base current $I_{Base}$ already flows, when the electrical current controller 18 is inactive and no electrical current control signal 19 feeds into the source-drain, electrical current path. The drive circuit thus provides a base current $I_{Base}$, even when the electrical current controller 18 is not yet supplied with electrical current. Through this base current $I_{Base}$ flowing from the beginning, the electrical current control transistor T1 is conducting, so that the supply voltage $V_{MAU}$ is made available to the field device. As soon as the electrical current controller 18 is supplied with electrical current, it delivers an electrical current control signal 19, which is fed into the source-drain, electrical current path of T2' and modulates the bus current $I_{Bus}$. Especially, through feeding of an electrical current control signal 19 into the junction between the drain of T2' and the resistor R3, the voltage drop on R3 can be increased and, as a result thereof, the base current $I_{Base}$ can be lessened.

Figure 4:
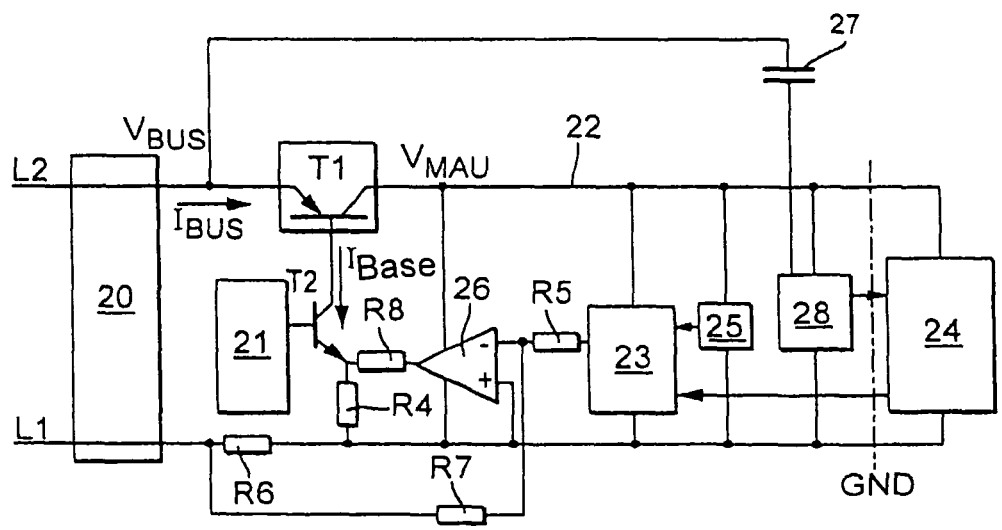
FIG. 4 is a detailed drawing of a fieldbus unit of the invention.

FIG. 4 shows the circuit of a fieldbus unit already presented in FIG. 2, this time in more detail. The two conductors L1, L2 of the fieldbus are connected to the fieldbus unit via the disturbance removing, rectifier unit 20. The bus voltage $V_{Bus}$ lies consequently on the emitter of the electrical current control transistor T1. By the circuit 21, the base of the drive transistor T2 is placed at a fixed potential, so that already during start-up of the field device a base current $I_{Base}$ can flow via the collector-emitter path of T2 and the electrical current limiting resistor R4. Therefore, the electrical current control transistor T1 is conducting during start-up, and a supply voltage $V_{MAU}$ is available on the supply line 22.

In order to transmit data, especially measurement data, on the fieldbus, an electrical current modulation is impressed on the electrical current drawn by field device. The data to be modulated onto the electrical current drawn by field device are supplied to the Profibus signal generator 23 of the digital signal processing unit 24. The reference voltage unit 25 provides one or a number of reference voltages. The Profibus signal generator 23 produces an analog control signal, which is supplied via the resistor R5 to the inverting input of the operational amplifier 26. The voltage drop on the electrical current measuring resistor R6 is fed back via the resistor R7 to the inverting input of the operational amplifier 26. The non-inverting input of the operational amplifier 26 is connected with the circuit zero point GND. On the output of the operational amplifier 26 is produced, proportional to the difference of the two inputs, an electrical current control signal, which is coupled via the resistor R8 into the collector-emitter, electrical current path of the drive transistor T2. In this way, the base current $I_{Base}$ and therewith also the bus current $I_{Bus}$ are modulated corresponding to the digital signal delivered by the digital signal processing unit 24.

The fieldbus unit shown in FIG. 4 comprises, moreover, elements for evaluation of voltage modulations modulated onto the bus voltage $V_{Bus}$ on the part of the master. These voltage modulations reach the receiving filter 28 via the capacitor and are then evaluated by the digital signal processing unit 24.

The invention claimed is:

1. A fieldbus unit for the connection of a field device to a fieldbus comprising two conductors, wherein the fieldbus unit is designed for transferring a signal over the fieldbus by modulation of an electrical current drawn by the field device, the fieldbus unit, comprises:
   an electrical current control transistor, through which the electrical current drawn by the field device flows, wherein the electrical current drawn by the field device is controlled via a base current of said electrical current control transistor; an electrical current controller, which produces an electrical current control signal for controlling the electrical current drawn by the field device; and
   a bipolar transistor, which is operated in common base configuration and via whose emitter-collector, electrical current path the base current for operating said electrical current control transistor flows, wherein:
   the base of said bipolar transistor is kept at an essentially constant potential, which so is selected, that said bipolar transistor supplies said electrical current control transistor a base current sufficient for start-up of the field device, when said electrical current controller is not supplied with electrical current and delivers no electrical current control signal; and
   said electrical current controller feeds the electrical current control signal via the emitter-collector, electrical current path of the bipolar transistor.

2. The fieldbus unit as claimed in claim 1, wherein:
   the field device comprises a physical to electrical, sensor element, and the signal is a measurement signal of said physical to electrical, sensor element.

3. The fieldbus unit as claimed in claim 1, wherein:
   said bipolar transistor provides for said electrical current control transistor, when said electrical current controller is not supplied with electrical current and delivers no electrical current control signal, a base current, which is sufficiently large to make said electrical current control transistor conductive and to supply the field device with electrical current.

4. The fieldbus unit as claimed in claim 1, wherein:
   the base of said bipolar transistor is set with the aid of one or more, series connected, conductively oriented diodes to a potential positive relative to the circuit zero point.

5. The fieldbus unit as claimed in claim 1, wherein:
   the base of said electrical current control transistor is connected via the emitter-collector path of said bipolar transistor and an electrical current limiting resistor with a circuit zero point of the fieldbus unit.

6. The fieldbus unit as claimed in claim 1, wherein:
   said bipolar transistor is an npn-transistor, and the emitter of said bipolar transistor is connected with the circuit zero point via an electrical current limiting resistor.

7. The fieldbus unit as claimed in claim 1, wherein:
said bipolar transistor is an npn-transistor; and
said electrical current controller is designed to supply the electrical current control signal to the emitter of said bipolar transistor.

8. A field device for connection to a fieldbus comprising two conductors, wherein the field device comprises a fieldbus unit for the connection of a field device to a fieldbus comprising two conductors, wherein the fieldbus unit is designed for transferring a signal over the fieldbus by modulation of an electrical current drawn by the field device, the fieldbus unit, comprises:
an electrical current control transistor, through which the electrical current drawn by the field device flows, wherein the electrical current drawn by the field device is controlled via a base current of said electrical current control transistor;
an electrical current controller, which produces an electrical current control signal for controlling the electrical current drawn by the field device; and
a bipolar transistor, which is operated in common base configuration and via whose emitter-collector, electrical current path the base current for operating said electrical current control transistor flows, wherein:
the base of said bipolar transistor is kept at an essentially constant potential, which so is selected, that said bipolar transistor supplies said electrical current control transistor a base current sufficient for start-up of the field device, when said electrical current controller is not supplied with electrical current and delivers no electrical current control signal; and
said electrical current controller feeds the electrical current control signal via the emitter-collector, electrical current path of the bipolar transistor.

9. A fieldbus unit for connection of a field device to a fieldbus comprising two conductors, wherein the fieldbus unit is designed for transferring a signal via the fieldbus by modulation of an electrical current drawn by the field device, the fieldbus unit, comprises:
an electrical current control transistor, through which the electrical current drawn by the field device flows, wherein the electrical current drawn by the field device is controlled via a base current of said electrical current control transistor;
an electrical current controller, which produces an electrical current control signal for controlling the electrical current drawn by the field device;
a field effect transistor, which is operated in common gate configuration and via whose source-drain, electrical current path the base current for driving said electrical current control transistor flows, wherein:
the gate connection of said field effect transistor is placed at an essentially constant potential, which is so selected, that said field effect transistor supplies to said electrical current control transistor a base current sufficient for start-up of the field device, when said electrical current controller is not supplied with electrical current and delivers no electrical current control signal; and
said electrical current controller feeds the electrical current control signal via the source-drain, electrical current path of the field effect transistor.

10. The fieldbus unit as claimed in claim 9, wherein:
the field device comprises a physical to electrical, sensor element and the signal is a measurement signal of said physical to electrical, sensor element.

11. The fieldbus unit as claimed in claim 9, wherein:
said field effect transistor provides to said electrical current control transistor, when said electrical current controller is not supplied with electrical current and delivers no electrical current control signal, a base current, which is sufficiently large to make said electrical current control transistor conductive, in order to supply the field device with electrical current.

12. The fieldbus unit as claimed in claim 9, wherein:
said field effect transistor is a junction-FET, abbreviated JFET, whose source-drain path conducts, when its gate is connected with the circuit zero point.

13. The fieldbus unit as claimed in claim 9, wherein:
the base of said electrical current control transistor is connected via the source-drain path of said field effect transistor and an electrical current limiting resistor with a circuit zero point of the fieldbus unit.

14. The fieldbus unit as claimed in claim 9, wherein:
the gate of said field effect transistor is connected with the circuit zero point.

15. The fieldbus unit as claimed in claim 9, wherein:
the drain of said field effect transistor is connected with the circuit zero point via an electrical current limiting resistor.

16. The fieldbus unit as claimed in claim 9, wherein:
said electrical current controller is designed to supply the electrical current control signal to the drain of said field effect transistor.

17. A field device for connection to a fieldbus comprising two conductors, wherein the field device comprises a fieldbus unit for connection of a field device to a fieldbus comprising two conductors, wherein the fieldbus unit is designed for transferring a signal via the fieldbus by modulation of an electrical current drawn by the field device, the fieldbus unit, comprises:
an electrical current control transistor, through which the electrical current drawn by the field device flows, wherein the electrical current drawn by the field device is controlled via a base current of said electrical current control transistor;
an electrical current controller, which produces an electrical current control signal for controlling the electrical current drawn by the field device;
a field effect transistor, which is operated in common gate configuration and via whose source-drain, electrical current path the base current for driving said electrical current control transistor flows, wherein:
the gate connection of said field effect transistor is placed at an essentially constant potential, which is so selected, that said field effect transistor supplies to said electrical current control transistor a base current sufficient for start-up of the field device, when said electrical current controller is not supplied with electrical current and delivers no electrical current control signal; and
said electrical current controller feeds the electrical current control signal via the source-drain, electrical current path of the field effect transistor.

* * * * *